United States Patent
Gan et al.

(10) Patent No.: US 7,263,649 B2
(45) Date of Patent: Aug. 28, 2007

(54) CONVERTING CIRCUIT FOR PREVENTING WRONG ERROR CORRECTION CODES FROM OCCURRING DUE TO AN ERROR CORRECTION RULE DURING DATA READING OPERATION

(75) Inventors: Wee-Kuan Gan, Taipei (TW); Chih-Jen Hsu, Taipei (TW)

(73) Assignee: Phison Electronics Corporation, Taipei (TW)

(*) Notice: Subject to any disclaimer, the term of this patent is extended or adjusted under 35 U.S.C. 154(b) by 499 days.

(21) Appl. No.: 10/710,860

(22) Filed: Aug. 9, 2004

(65) Prior Publication Data

US 2006/0031739 A1  Feb. 9, 2006

(51) Int. Cl.
*H03M 13/37* (2006.01)
(52) U.S. Cl. .................. 714/766; 714/763; 714/773
(58) Field of Classification Search ............. 714/763, 714/766, 773; H03M 13/37
See application file for complete search history.

(56) References Cited

U.S. PATENT DOCUMENTS

2002/0170015 A1* 11/2002 Hornung et al. ............ 714/766
2005/0172086 A1* 8/2005 Kawai ........................ 711/154
2007/0016721 A1* 1/2007 Gay ............................ 711/103

OTHER PUBLICATIONS

Wikimedia Foundation, Inc., Hexadecimal, Jan. 27, 2007, Wikipedia, the free encyclopedia, pp. 1-7, URL: http://en.wikipedia.org/wiki/Hexadecimal.*

* cited by examiner

*Primary Examiner*—R. Stephen Dildine
(74) *Attorney, Agent, or Firm*—Jianq Chyun IP Office

(57) ABSTRACT

A converting circuit, for preventing wrong error correction code from occurring due to an error correction rule during data reading operation is provided. When the flash memory controller writes all 0xFF data into the flash memory, the byte error correction rule generates a set of correct error correction codes and the error correction code converting circuit converts the set of correct error correction codes into 0xFF error correction codes, and values stored in the data area and error correction code area of the flash memory are converted into 0xFF to prevent wrong error correction code from occurring during data reading operation when the error correction codes are not completely 0xFF.

3 Claims, 1 Drawing Sheet

CONVERTING CIRCUIT FOR PREVENTING WRONG ERROR CORRECTION CODES FROM OCCURRING DUE TO AN ERROR CORRECTION RULE DURING DATA READING OPERATION

BACKGROUND OF INVENTION

1. The field of the invention

The present invention relates to a converting circuit for preventing wrong error correction code from occurring due to an error correction rule during data reading operation. More particularly, when the flash memory controller writes all 0xFF data into the flash memory, the byte error correction rule generates a set of correct error correction codes and the error correction code converting circuit converts the set of correct error correction codes into 0x FF error correction codes, and values stored in the data area and error correction code area of the flash memory are converted into 0xFF to prevent wrong error correction codes from occurring during data reading operation when the error correction codes are not completely 0xFF.

2. Description of related art

The flash memory is popular because of its advantageous characteristics, such as low power consumption, non-volatility, shock tolerance and high storage density. The flash memory has gradually replaced EEPROM or battery powered memory in majority portable devices. And the mature semiconductor technology allows further increased the storage density and transmission speed of the flash memory. Thus, the flash memory has successfully replaced the traditional storage media, such as the hard disk.

For maintaining completeness of the data stored in the flash memory, some manufacturers invented the error correction rule to calculate the value of the error correction code and the error correction rule corrects the bit when the bit error occurs. However, the conventional error correction rule in the flash memory is a single bit error correction rule, wherein the single bit error correction rule can judge whether a single or plurality of damaged bits exist when the micro processor demands data from the flash memory. If any single bit error occurs, the single bit error correction rule corrects the bit error. On the other hand, when a byte error occurs, the single bit error correction rule will report the error but however the single bit error correction rule cannot correct the byte error. For enabling the single bit error correction rule to correct the byte error, the byte error correction rule is necessary.

To apply the flash memory into the portable storage device, an erase command must be executed to convert the data area and the error correction code area of the flash memory into 0xFF, and if the single bit error correction rule is selected, both the data and the error correction codes are converted completely into 0xFF. Thus, there will be no occurrence of error in error correction codes during the subsequent data reading operation. But when the byte correction rule is selected and when the data is completely 0xFF and the error correction codes are not completely 0xFF, then the memory parity error will occur, or even worse, the data reading operation cannot be executed.

Therefore, it is highly desirable to prevent the wrong error correction codes from occurring due to the byte correction rule.

SUMMARY OF INVENTION

Accordingly, in the view of the foregoing, the present inventor makes a detailed study of related art to evaluate and consider, and uses years of accumulated experience in this field, and through several experiments, to create a new converting circuit for allowing increased error bytes tolerance and thereby prevent the error correction code error from occurring due to the byte correction rule.

According to an aspect of the present invention, the converting circuit is adapted for converting error correction codes calculated by the byte error correction rule into completely 0xFF when the data is all 0xFF. Therefore, the occurrence of memory parity error can be effectively reduced or failure of execution data reading operation due to the error correction codes not being completely 0x FF can be effectively reduced. Accordingly, more byte errors tolerance can be allowed in flash memory by using the byte correction rule.

BRIEF DESCRIPTION OF DRAWINGS

For a more complete understanding of the present invention, reference will now be made to the following detailed description of preferred embodiments taken in conjunction with the following accompanying drawings.

DETAILED DESCRIPTION

Figure 1:
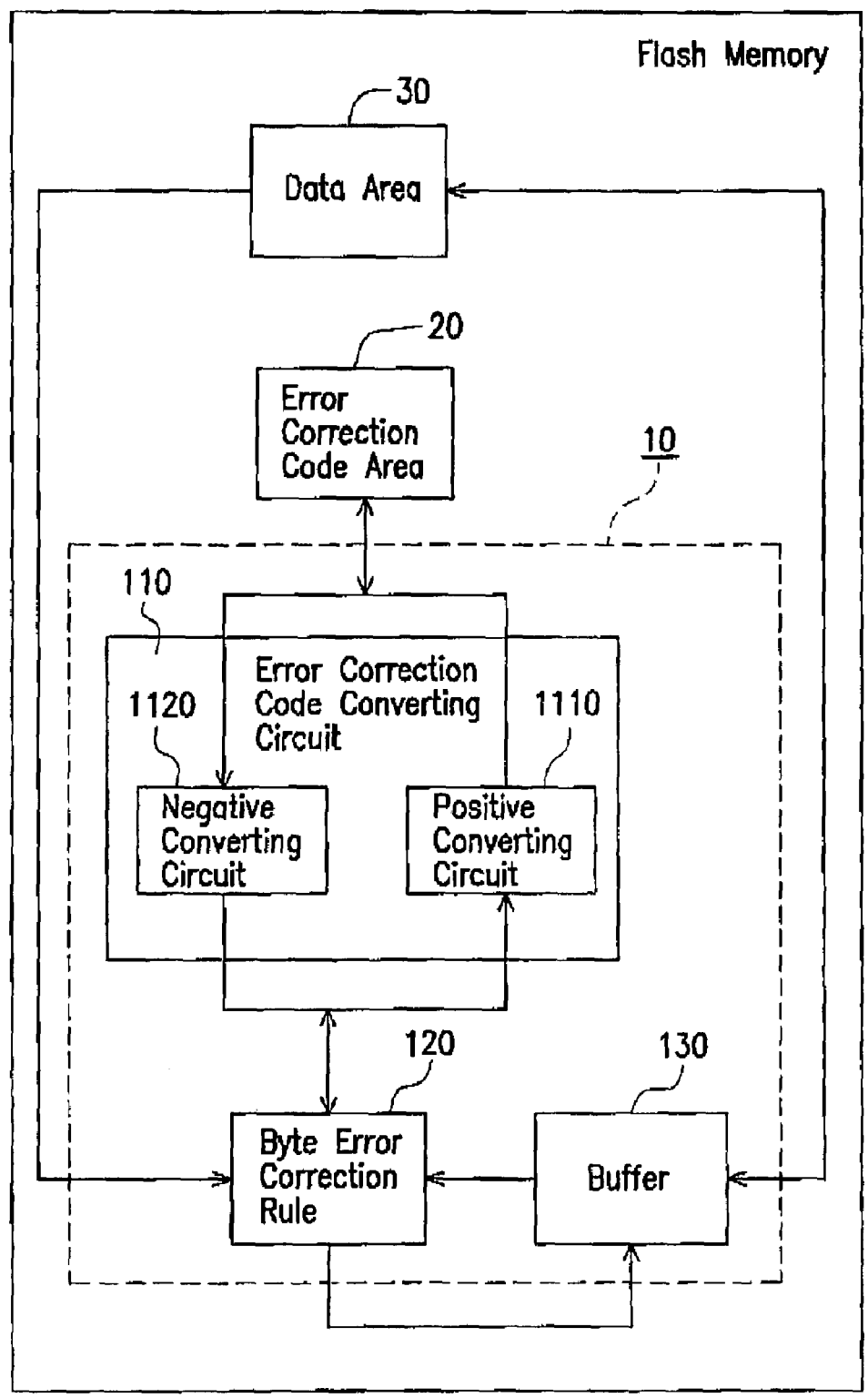
FIG. 1 illustrates a block circuit layout of a flash memory according to an embodiment of the present invention.

Reference will be made in detail to the preferred embodiments of the invention, examples of which are illustrated in the accompanying drawings. Wherever possible, the same reference numbers are used in the drawings and the description to refer to the same or like parts.

Referring to FIG. 1, the flash memory, according to an embodiment of the present invention, comprises a flash memory controller 10, an error correction code area 20 and a data area 30.

The flash memory controller 10 comprises an error correction code converting circuit 110 having a positive converting circuit 1110 and a negative converting circuit 1120. The error correction code converting circuit 110 is connected to the byte error correction rule 120 connected to a buffer 130.

The error correction code area 20 is connected to the flash memory controller 10 and the error correction code area 20 is adapted for storing the error correction code generated by the flash memory controller 10.

The data area 30 is adapted for storing the data transmitted by the flash memory controller 10 and the data area 30 is connected to the flash memory controller 10.

When the flash memory controller 10 executes a write command for writing data into the flash memory, the data stored in the buffer 130 is directly written into the data area 30 of the flash memory. Meanwhile, the byte error correction rule 120 generates a set of the error correction codes. The generated error correction codes are converted by the positive converting circuit 1110 of the error correction code converting circuit 110 and the converted error correction codes are stored into the error correction code area 20 of the flash memory.

When the flash memory controller 10 executes a read command for reading data to the flash memory, the data stored in the data area 30 of the flash memory is directly read into the buffer 130. Meanwhile, the data is transmitted to the byte error correction rule 120. The error correction code of the error correction code area 20 is reversely convened into the original error correction code by the negative converting circuit 1120 of the error correction code converting circuit 110 and transmitted to the byte error correction rule 120 in order to calculate and decode the error of the data transmitted back from the data area 30. If the calculated result shows byte error, the error correction can be implemented promptly to correct the byte error in the buffer 130 into the correct value.

According to the above description, when the flash memory executes an erase command, the value in the data area 30 and the error correction area 20 of the flash memory are all converted into 0xFF. When the flash memory controller 10 reads data from the flash memory, the data in the error correction code area 20 is converted into the correct error correction code by the error correction code converting circuit 110 into correct the error data. When the flash memory controller 10 writes all 0x FF data to the flash memory, the byte error correction rule 120 generates a set of the correct error correction codes, which is then converted into the 0xFF error correction codes by the error correction code converting circuit 110, and finally stored into the data area 30 and the error correction code area 20 of the flash memory as 0xFF value.

Without the error correction code converting circuit 110, the data in the buffer 130 is calculated by the byte error correction rule 120 resulting an error correction code, which is directly stored into the error correction code area 20 of the flash memory. The data read out from the data area 30 of the flash memory is calculated by the byte error correction rule 120 resulting an error correction code and this error correction code is compared with the error correction code read out from the error correction code area 20 of the flash memory. The values of these two error correction codes are equal to each other when there is no error. For example, $E^i f = E^i C$ (i=1~N), wherein:

$E^i f$: is the error correction code stored in the error correction code area 20

$E^i C$: is the resulting error correction code $\Rightarrow E^1 f, E^2 f, E^3 f \ldots E^N f = E^1 C, E^2 C, E^3 C \ldots E^N C$ With the error correction code converting circuit 110, the error correction code calculated by the byte error correction rule 120 is converted by the positive converting circuit 1110 of the error correction code converting circuit 110 and stored into the error correction code area 20 of the flash memory. The error correction code read out from the error correction code area 20 of the flash memory is reversely converted by the negative converting circuit 1120 of the error correction code converting circuit 110, and the error correction code is compared with the data read out from the data area 30 of the flash memory and calculated by the byte error correction rule 120, wherein the values of these two are equal each other when there is no error.

For example, $E^i f = E^i C \oplus E^i A$ (i=1~N), wherein:

$E^i f$: is the error correction code stored in the error correction code area 20

$E^i C$: is the resulting error correction code $E^i A$: is a constant for the error correction code converting circuit 110

$\Rightarrow E^1 f, E^2 f, E^3 f \ldots E^N f = (E^1 C \oplus E^1 A), (E^2 C \oplus E^2 A), (E^3 C \oplus E^3 A) \ldots (E^N C \oplus E^N A)$ Wherein, the positive converting circuit 1110 and the negative converting circuit 1120 of the error correction converting circuit 110 are same. For example, $E^i C = E^i f \oplus E^i A$ (i=1~N)

Assuming values of the data area 30 and the error correction code area 20 of the flash memory are [D, $E^1 f$, $E^2 f$, $E^3 f \ldots E^N f$], when error occurs, the values become [D⊕e, $E^1 f \oplus e^1 f$, $E^2 f \oplus e^2 f$, $E^3 f \oplus e^3 f$, ... $E^N f \oplus e^N f$]. Afterwards, the negative converting circuit 1110 of the error correction converting circuit 110 executes the conversion resulting into [D⊕e, $E^1 f \oplus e^1 f \oplus E^1 A$, $E^2 f \oplus e^2 f \oplus E^2 A$, $E^3 f \oplus e^3 f \oplus E^3 A$, ... $E^N f \oplus e^N f \oplus E^N A$]=[D⊕e, $E^1 C \oplus E^1 A \oplus e^1 f \oplus E^1 A$, $E^2 C \oplus E^2 A \oplus e^2 f \oplus E^2 A$, $E^3 C \oplus E^3 A \oplus e^3 f \oplus E^3 A$, ... $E^N C \oplus E^N A \oplus e^N f \oplus E^N A$]=[D⊕e, $E^1 C \oplus e^1 f$, $E^2 C \oplus e^2 f$, $E^3 C \oplus e^3 f \ldots E^N C \oplus e^N f$].

According to the above description, although an error correction code converting circuit 110 is added, the address and the value due to actual error are not affected. Therefore, byte error correction rule 120 can function normally and can also solve the problem of data reading with wrong error correction code when the error correction codes are not completely 0xFF.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

The invention claimed is:

1. A converting circuit, for preventing wrong error correction code from occurring due to an error correction rule during data reading operation, comprising:

a flash memory controller, comprising an error correction code converting circuit connected to a byte error correction rule;

an error correction code area, connected to said flash memory controller, for storing error correction codes generated by said flash memory controller; and a data area, connected to said flash memory controller, for storing data transmitted by said flash memory, wherein when said flash memory controller writes all 0x FF data into said flash memory, said byte error correction rule generates a set of correct error correction codes for said data area and said error correction code converting circuit converts said set of correct error correction codes into 0xFF error correction codes, and values stored in said data area and error correction code area of said flash memory are converted into 0xFF to prevent wrong error correction code from occurring during data reading operation when said error correction codes are not completely 0xFF.

2. The converting circuit according to claim 1, wherein said error correction code converting circuit comprises a positive converting circuit and a negative converting circuit.

3. The converting circuit according to claim 1, wherein said flash memory controller comprises a buffer.

* * * * *